(12) United States Patent
Parrott

(10) Patent No.: US 7,918,777 B2
(45) Date of Patent: Apr. 5, 2011

(54) PILL CATCHER

(76) Inventor: Frances Irene Parrott, Plymouth, MI (US)

( * ) Notice: Subject to any disclaimer, the term of this patent is extended or adjusted under 35 U.S.C. 154(b) by 194 days.

(21) Appl. No.: 12/284,797

(22) Filed: Sep. 25, 2008

(65) Prior Publication Data

US 2010/0076244 A1 Mar. 25, 2010

(51) Int. Cl.
*B09B 3/00* (2006.01)
(52) U.S. Cl. .................................................. 588/249.5
(58) Field of Classification Search .............. 588/249.5; 599/249.5, 252
See application file for complete search history.

(56) References Cited

U.S. PATENT DOCUMENTS 4,028,265 A * 6/1977 Barney et al. .................. 588/10
4,149,968 A * 4/1979 Kupiec et al. ................. 210/665

FOREIGN PATENT DOCUMENTS

JP 4-48980 * 2/1992

OTHER PUBLICATIONS

"Proper Disposal of Prescription Drugs" Office of National Drug Control Policy, dated Feb. 2007.*

* cited by examiner

*Primary Examiner* — John Kreck

(57) ABSTRACT

A method for the exclusive and singular treatment of all pharmaceuticals and drugs in any form that have passed their effective date, or are no longer of use to the individual, by mixing the pharmaceuticals and drugs with a granular solidification agent and water to form a non hazardous slurry which will solidify the liquefied pharmaceuticals and drugs into a non hazardous, environmentally friendly mixture safe for disposal into normal solid trash receptacles and landfills, and no longer a potential legal risk from ingestion after depositing into trash system. In this treatment the additional potential health risk and legal liability is eliminated from drugs and pharmaceuticals going into toilets and drains to sanitary sewers or septic tanks, and becoming liquid and untreatable at municipal wastewater treatment plants or septic fields, thereby returning to fresh water resources causing a risk to the general public health.

1 Claim, 6 Drawing Sheets

Plastic Bag with water and pills added.

Figure #1: Plastic Bag with Product.
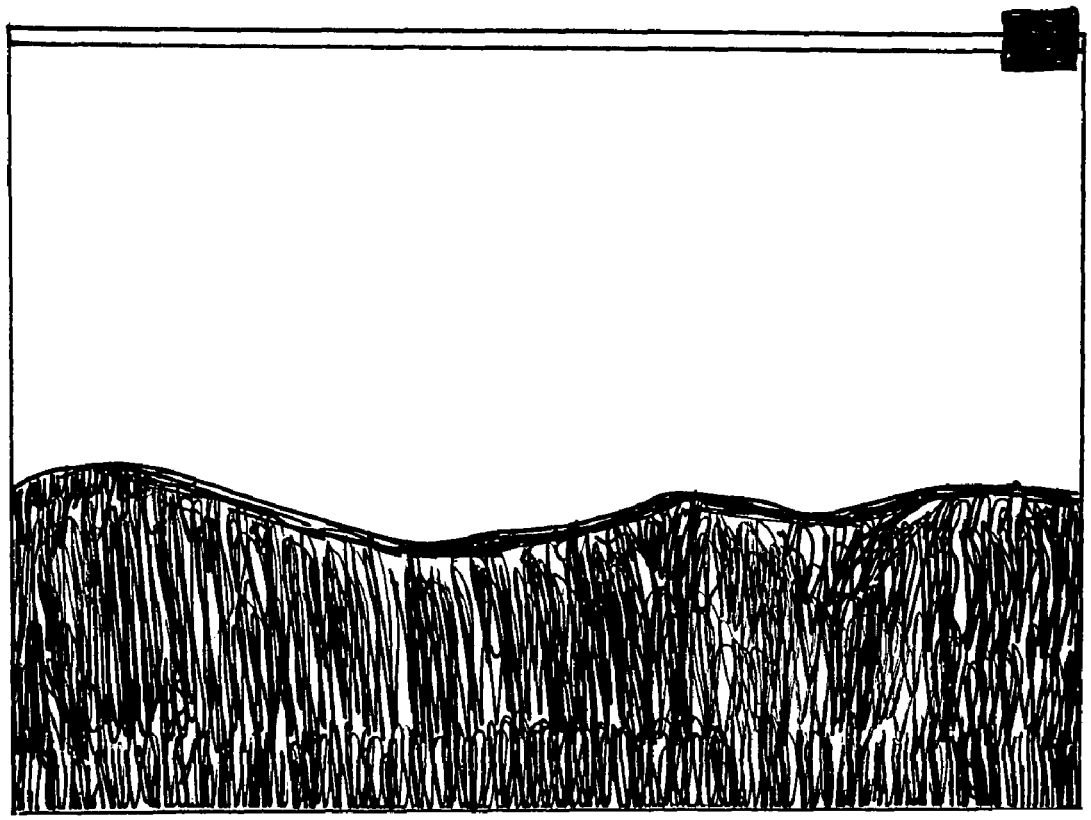

Figure #2: Plastic Bottle with Product.
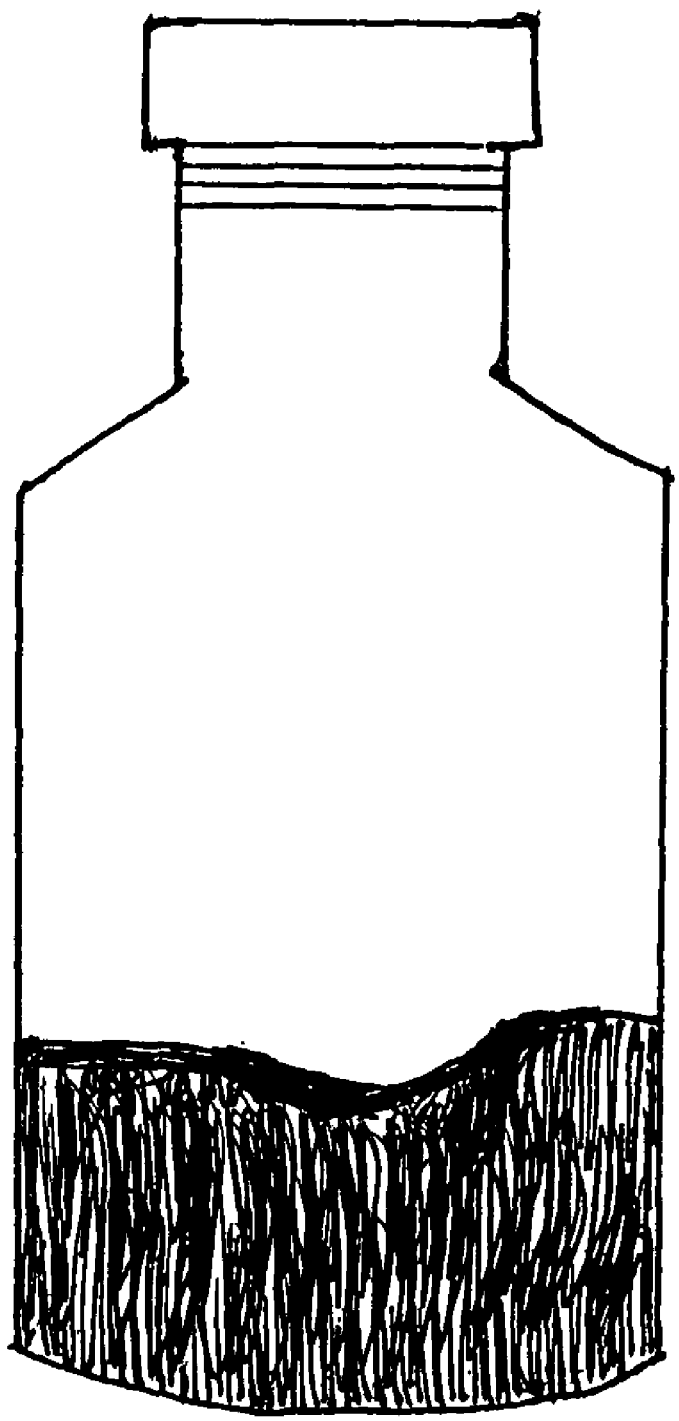

Figure #3: Plastic Bag with water and pills added.
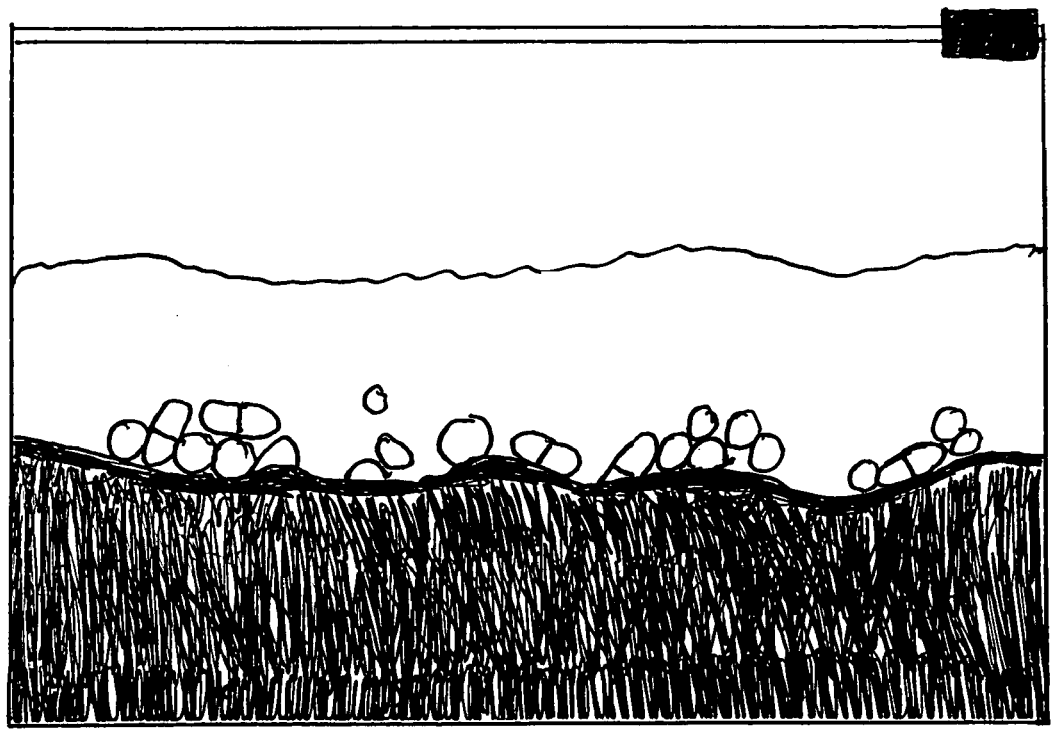

Figure #4: Plastic Bottle with product, pills, and water.
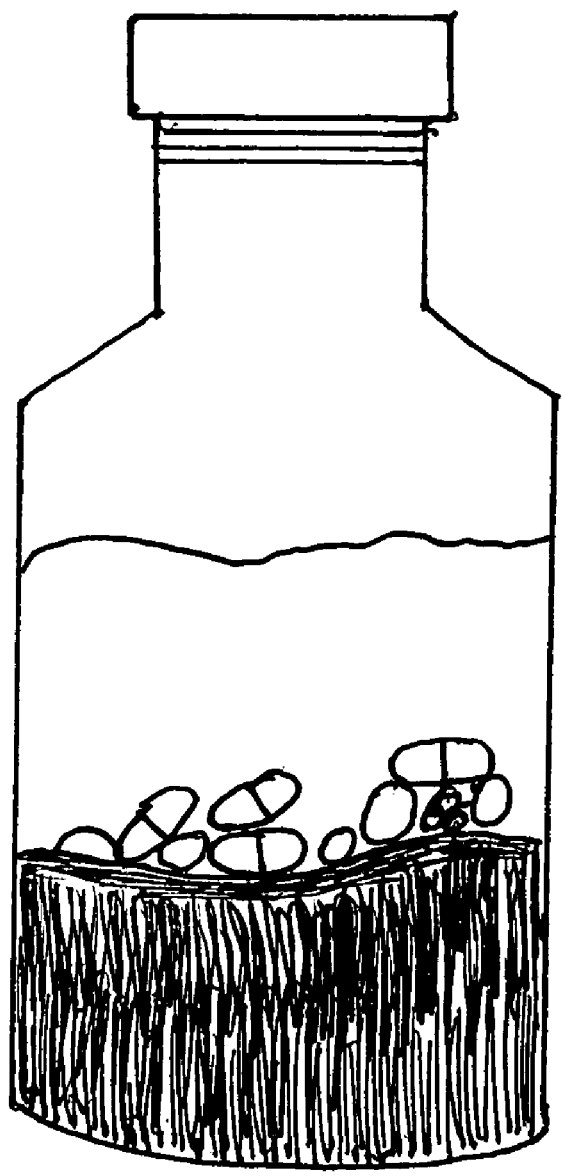

Figure #5: Plastic Bag shaken for disposal.
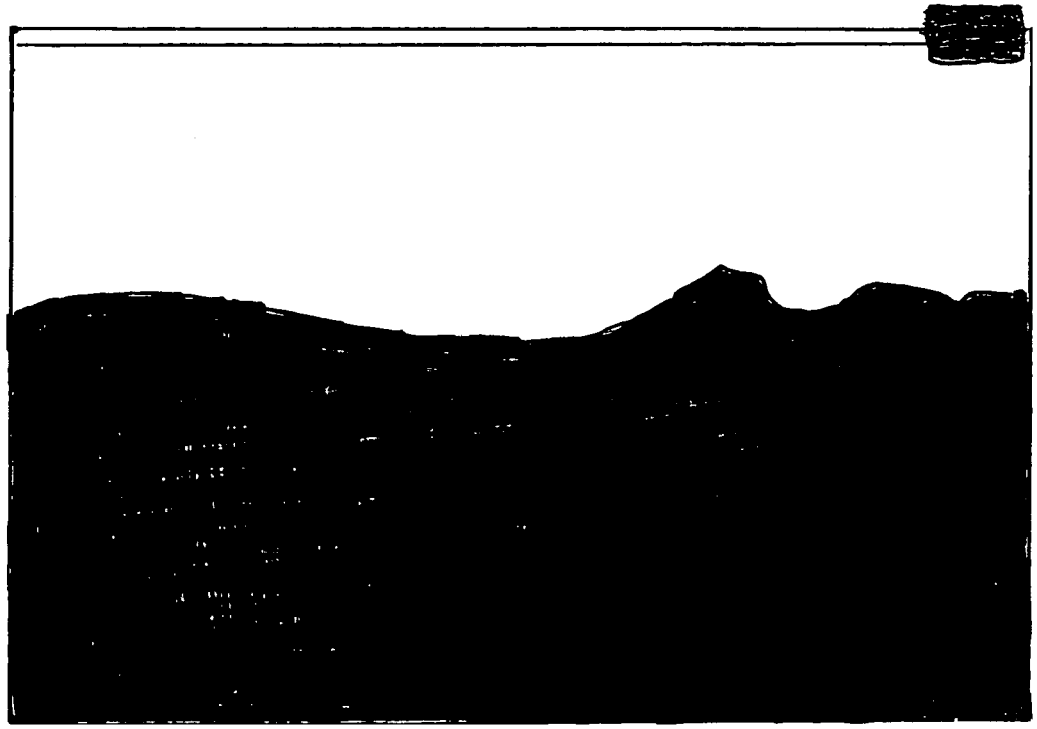

Figure #6: Plastic Bottle shaken for disposal.
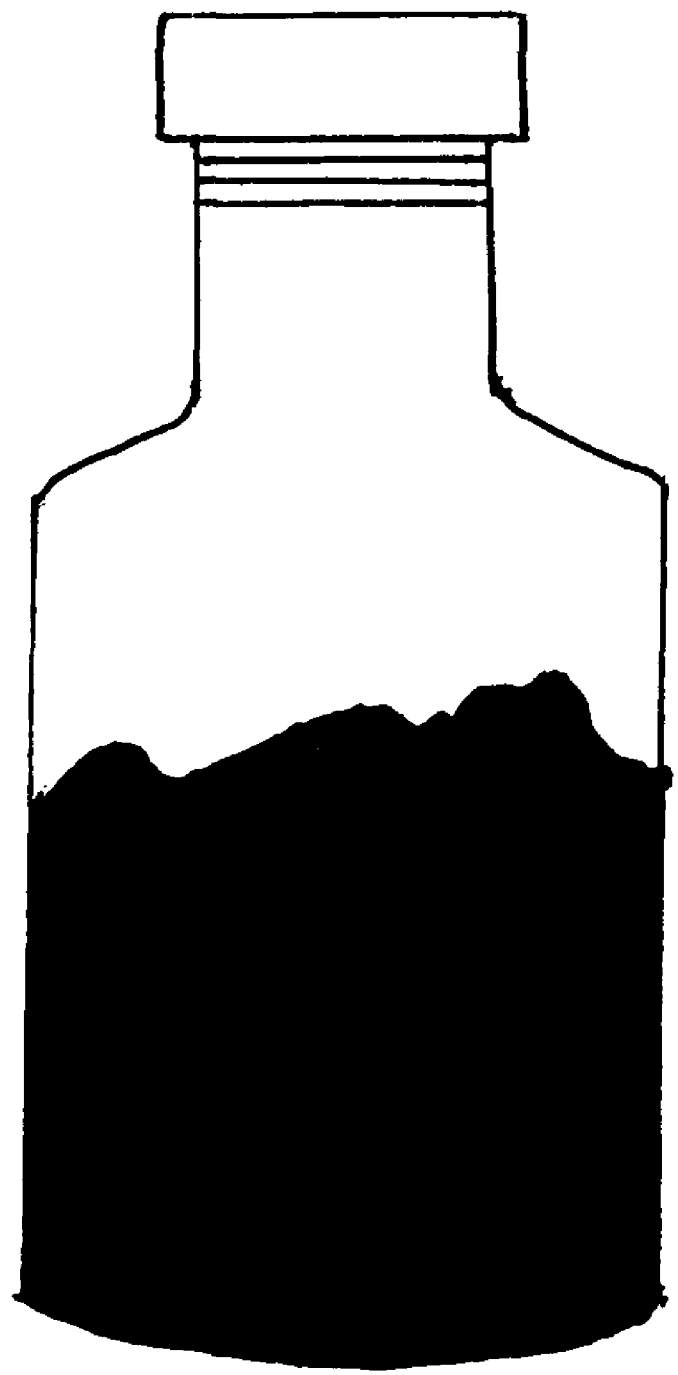

PILL CATCHER

CROSS-REFERENCE TO RELATED APPLICATIONS

Not Applicable.

STATEMENT REGARDING FEDERALLY SPONSORED RESEARCH AND DEVELOPMENT

Not applicable.

REFERENCE TO SEQUENCE LISTING, A TABLE, OR A COMPUTER PROGRAM LISTING COMPACT DISC APPENDIX

Not Applicable.

BACKGROUND OF INVENTION

This invention is in the field of waste treatment and solidification of solid and liquid waste for safe disposal into ordinary trash and landfills. Specifically, this invention is unique using granular or powdered forms of bentonite clay mixed with water, and is designed solely for the safe treatment of all pharmaceutical drugs that are disposed of due to expiration dates or lack of further need, whether they be in a pill, gel capsule, tablet, powder, or liquid form, by encapsulating them into a solid matrix and preventing them from eventually entering fresh water supplies.

This need exists due to the fact that many drugs today are disposed of into sanitary sewers, as the disposers wish to avoid any problems such as injury or death and the corresponding legal liability of the disposer, with use by unknown individuals, animals, or small children when pharmaceuticals are disposed of in normal trash receptacles. As such, these drugs once dissolved in the water supply from toilets or normal sewerage drains, can be untreatable at local municipal waste treatment plants or septic fields, and end up being discharged into fresh water surface lakes, rivers, streams, ponds, oceans, and underground aquifers where they can be recycled into drinking water systems and endanger the public over an extended period of time.

The prior state of the art has ignored this area of treatment, and has focused on general industrial and municipal waste from: general manufacturing and merchandising, defense manufacturing, ordinance, oil exploration, nuclear weapons and energy manufacturing, and general residential and commercial solid wastes. As such the direct application to the specific segment of pharmaceutical disposal has never been singled out for specific separate treatment in the prior years that this waste was in combined trash, and one can not assume such separation would occur to someone in the normal course of waste trade or it would have occurred by now. Likewise, pharmaceutical and drug disposal has been a normal part of operation for people who deal directly with pharmaceuticals, and in the course of their everyday work they would not have common knowledge of solidification agents for solid disposal, or likewise it would have been done by now. The unique application of solidifying agents being mixed specifically with pharmaceuticals and drugs for disposal into normal trash receptacles removes both the risk and liability of these products getting into others hands or into fresh water systems that provide drinking water.

In a large part, the current disposal practice part of pharmaceuticals and drugs by hospitals, doctors, dentists, treatment centers, and individuals, is mostly by disposal into sanitary sewer systems by disposers flushing them down toilets or sinks to avoid other individuals or animals from obtaining disposed pharmaceuticals and drugs and ingesting them, thereby exposing them to health risk or death, and the disposers to extreme legal liability, but by disposing into sewer systems they are presenting an unintended serious risk to the general public. Traces of disposed drugs have been showing up in waters of the Great Lakes, as an example. As stated above, This sanitary sewer disposal is the chosen method of disposal simply to eliminate the fear of other individuals, pets, or children discovering discarded pharmaceuticals in trash containers and consuming them. This patent application's unique method of treatment for pharmaceuticals singularly for disposal would eliminate such risks through the individual treatment and disposal so that they are rendered harmless to society in landfills and no longer at risk of entering fresh water resources.

This invention offers a definite improvement on current technology and practices offering a unique method of treating pharmaceutical and drug disposal and eliminating definite risks and legal liabilities. It is also an invention that one could not assume would occur in the course of daily work to someone in the field of waste solidification or in the medical or pharmaceutical fields as it has not occurred in the last 85 years these products have been available.

Current U.S. Patent Classifications. Known applicable Current U.S. Patent Classifications include, but may not be limited to, the following Classes and Brief Definitions:

106/607: Compositions: Coatings or Plastic

252/60; 252/63/; 252/72: Solidification, Vitrification, or Cementation of Compositions 588/251; 588/252: Hazardous or Toxic Waste Destruction or Containment

BRIEF SUMMARY OF THE INVENTION

I invented the "Pill Catcher", and I am applying for a Non Provisional Utility Patent with this application. The object of this invention is to resolve the pharmaceutical and drug disposal problem by offering a unique vehicle to specifically and solely process expired or no longer required pharmaceuticals and drugs by the individual disposer, whether that be a hospital, doctor, dentist, clinic, treatment center, or individual, rendering them harmless and safe for disposal at the site of disposal into normal solid waste disposal containers for eventual landfill deposit (Refer to Background Section of this Patent Application on Pages 5 to 8).

This invention also eliminates not only the legal risks to the disposer, but also all the health risks to individuals and the general public from ingesting these pharmaceuticals and drugs, and the risk to the overall general public from ingestion and contamination of fresh water supplies (see the Background of the Invention on Page 5 to 8). It is also the lowest cost safe treatment for these pharmaceuticals and drugs.

In using the Pill Catcher, the pharmaceuticals and/or drugs are deposited into a container, and then the disposer adds the required amount of water, closes the container and shakes it for 2 minutes. Then the disposer simply places the container into the normal trash receptacle available. The disposal is now complete and the pharmaceuticals are encapsulated into a bentonite clay sludge eliminating any risk to others, animals, or presenting a danger to entry into fresh water resources and eventually drinking water.

The container for holding the contents can be either a sealable plastic bag or capped plastic container with labeling and directions on the outside of the package for disposer use. This application is intended to cover various sizes of similar containers with increased proportional amounts of bentonite clay and water, to handle various amounts of pharmaceuticals and drugs, so that institutional usages at hospitals and doctors and clinics, etc., can be accommodated in one vessel for large quantities (i.e. ½ gallon and 1 gallon sized vessels).

BRIEF DESCRIPTION OF THE SEVERAL VIEWS OF THE DRAWINGS

FIG. 1 (Page 22). This drawing shows the approximate size and type of plastic bag that could be used for a vessel, with appropriate labeling, and appropriate amount of bentonite clay. The bag can either be clear plastic to be seen through, or a solid color of choice plastic bag that is non transparent. FIG. 1 shows a transparent bag for illustration.

FIG. 2 (Page 23). This drawing shows the approximate size and type of plastic bottle that could be used for a vessel, with appropriate labeling and appropriate amount of bentonite clay. The bottle can either be clear plastic transparent, or a solid color of choice plastic bottle that is non transparent. This FIG. 2, shows a transparent bottle for illustration only.

FIG. 3 (Page 24). This drawing shows the transparent plastic bag after the addition of 5 ounces of tap water, and the pharmaceuticals that are being disposed of, sealed and ready to be shaken.

FIG. 4 (Page 25). This drawing shows the transparent bottle after the addition of 5 ounces of tap water and the pharmaceuticals that are being disposed of, sealed and ready to be shaken.

FIG. 5 (Page 26). This shows the transparent plastic bag after the disposer has shaken it for 2 minutes, and is ready to be discarded into a trash receptacle.

FIG. 6 (Page 27). This shows the transparent plastic bottle after the disposer has shaken it for 2 minutes, and is ready to be discarded into a trash receptacle.

DETAILED DESCRIPTION OF THE INVENTION

The Process of Manufacturing the Pill Catcher. The materials required for manufacture include: various granular sizes of bentonite clay in bulk sacks of 2000 lbs, metal hoppers that will hold the bentonite clay in a mixture of various or specific granular sizes. In addition labeled containers purchased in varying sizes of either plastic sealable bag stock or plastic bottle containers with sealable caps or lids, all purchased with proper labeling. Automated feeder hoppers that can inject into the containers the appropriate amount of bentonite clay, and shipping containers of cardboard to package and ship with appropriate labeling finished product to end users or retailers of drug manufacturers. The sacks will be placed onto a metal hopper which will have a variable feed pan feeder that will regulate the flow of bentonite clay into the assembly hopper. A conveyor will carry the "Pill Catcher" container to a valve that will open and dispense the appropriate amount of bentonite clay into the container. The container will continue on to the end of the conveyor, where robots will grab specific amounts of containers and place them into cardboard boxes traveling on a second conveyor. The boxes will be automatically folded, sent down a conveyor to be loaded with filled containers of the "Pill Catcher", and travel on to automatic sealing and labeling of the boxes. They will then be picked up by Robots and the boxes placed on a wood pallet and shrink wrapped and labeled for shipping to customers or warehouses.

This process varies from other forms of bentonite clay processing in that clay is normally sold in bulk sacks of 1 ton quantities, in 50 lb. bags, 40 per pallet (2000 lbs), or 300 to 500 lb fiber cardboard drums. The material is then sold to industrial users for general industrial waste solidification, nuclear power plants and weapons manufacturers for solidifying nuclear waste and treating nuclear rinse waters, off shore oil drilling in the treatment of drilling muds, to foundries as molding agents, to manufacturers of liners for landfills and wraps for basement construction to make unpenetrable barriers for waters and other fluids. Our process is designed solely for one market and one market function, the safe treatment of disposed pharmaceuticals and drugs to keep them out of individual hands for ingestion, animal ingestion, and polluting fresh water resources. In addition our packaging explicitly is labeled with the product title "Pill Catcher", and explicitly states that it's sole use is for pharmaceutical and drug disposal, which no other manufacturer has ever claimed or sold bentonite clay under specifically for decades, and therefore can not be assumed that in the ordinary course of daily work they would come up with this unique invention or field of use. Therefore it is also a definite product improvement for new use.

This is a unique singular application of a natural occurring product to which the producers of the product have never sought to consider, establish, or sell their product under, over the last 85 years. Our specific improvement is that we have found a way to eliminate the hazards of discarded pharmaceuticals going into trash containers where they could be taken and ingested by others individuals or children, or animals, and the dangers associated with trying to avoid this liability by flushing discarded pharmaceuticals and drugs down sanitary sewer lines and drains, and thereby creating a health hazard in fresh water resources as these drugs dissolve in the liquid sewerage and are untreatable at municipal waste treatment plants or individual septic fields, thereby being redeposited back into and ending up in lakes, rivers, ponds, and underground aquifers, creating a new health hazard to the general public at large, and fish and animals.

Once an individual desires to use the "Pill Catcher", use of the "Pill Catcher" (See FIGS. 1 and 2 on page 22 & 23), is accomplished in a 2 step process. This invention provides a container, in which is contained bentonite clay powder or grain in small quantity of four ounces dry measure (¼ cup), to which in step #1, FIGS. 1 and 2 in drawings, we add 4 to 5 ounces of simple tap water, and the pharmaceuticals or drugs for disposal in any mixture or type. Then is step #2, the container is then sealed by closing the opening on the top, and once closed the container is shaken by the disposer for 2 minutes (Drawing FIG. 3/4 on page 24/25). This will remove the pharmaceuticals and drugs from any third party being able to take them and ingest them due to liquification and then solidification. After the step #2 shaking for 2 minutes, the container can then simply be deposited by the disposer into a normal trash receptacle (Drawing FIG. 5/6 page 26/27). The container containing the treated mix will then be transported, mixed in with the other solid trash to a normal trash landfill where once the "Pill Catcher" is deposited into the landfill, it will no longer be a threat to the fresh water supply and fish as well.

In this simple and unique process we eliminate all liability to disposers and risks to the general public and/or animals to illness or death, and the risks of these pharmaceuticals and drugs ending up in fresh water drinking systems, thereby offering a definite improvement on existing methods of general waste solidification and disposal as used in the market today and the last several decades.

Once the water and pharmaceuticals are totally absorbed into the Bentonite Clay mixture, the solid waste passes all disposal requirements for standard landfills, including TCLP, and paint chip testing requirements established by the EPA and local municipalities.

I claim:

1. The exclusive and singular treatment of all pharmaceutical drugs in any form with bentonite clay into a safe environmentally friendly solid mixture for disposal into any landfill, by putting the drugs into an airtight container consisting essentially of an appropriate amount of bentonite clay, and adding an appropriate amount of liquid consisting essentially of water, then closing the container and shake mixing the contents for 40 to 120 seconds, then disposing of the container with the contents into any normal trash receptacle for landfill disposal.

* * * * *